United States Patent [19]

Evans et al.

[11] 3,956,519

[45] May 11, 1976

[54] PROCESS FOR AGGREGATING PROTEIN

[75] Inventors: Mervyn Thomas Arthur Evans, Ayot St. Lawrence; Malcolm Glyn Desmond Jones, Luton; Norman Jones, Codicote, near Hitchin, all of England

[73] Assignee: Thomas J. Lipton, Inc., London, England

[22] Filed: Dec. 4, 1974

[21] Appl. No.: 529,465

[30] Foreign Application Priority Data

| Dec. 13, 1973 | United Kingdom | 57847/73 |
| Apr. 4, 1974 | United Kingdom | 14986/74 |
| Sept. 2, 1974 | United Kingdom | 38281/74 |
| Nov. 19, 1974 | United Kingdom | 50032/74 |

[52] U.S. Cl................................ 426/564; 426/565; 426/570; 426/48
[51] Int. Cl.$^2$................. A23G 9/02; A23C 13/12
[58] Field of Search ............ 426/48, 565, 660, 564; 195/31, 66 R

[56] References Cited

UNITED STATES PATENTS

| 3,535,123 | 10/1970 | Heady | 426/48 |
| 3,565,765 | 2/1971 | Heady | 195/31 |
| 3,790,446 | 2/1974 | Smith | 195/66 R |

FOREIGN PATENTS OR APPLICATIONS

| 1,268,443 | 3/1972 | United Kingdom | 426/48 |
| 1,313,421 | 4/1973 | United Kingdom | 426/48 |
| 1,313,422 | 4/1973 | United Kingdom | 426/48 |

*Primary Examiner*—Jeanette M. Hunter
*Attorney, Agent, or Firm*—Brumbaugh, Graves, Donohue & Raymond

[57] ABSTRACT

Debranched amylopectin and debranched low-DE maltodextrin have been found to cause protein to aggregate in solution. Such aggregation, which can lead to precipitation or flocculation of the protein, is useful for instance in aerated aqueous fat emulsions, e.g. ice cream and whipped cream, where the stability of the product can be altered as desired.

9 Claims, No Drawings

PROCESS FOR AGGREGATING PROTEIN

The invention relates to a novel process using polysaccharides.

Proteins and polysaccharides are two important classes of natural polymers. Their interactions have long been known to be important, for instance, in food products. This has generally involved charged polysaccharides. It has been found, as already disclosed in general in the specifications accompanying our copending applications, that certain polysaccharides have surprisingly strong effects on proteins. This is particularly surprising because the polysaccharides are neutral. The present specification explains the invention further. The polysaccharides affect the solubility characteristics of proteins and in general increase their tendency to aggregate, particularly when heated. Aggregation can be monitored by optical methods. Often aggregation of the proteins causes them to precipitate or flocculate.

Polysaccharide mixtures that have this effect to such a surprising extent are obtained by debranching amylopectin or a low-DE (dextrose equivalent less than 25) maltodextrin using an alpha-1,6-glucosidase free of alpha-1,4-glucosidase.

The invention provides a process in which aggregation of a protein in aqueous solution is induced by dissolved debranched low-DE maltodextrin or debranched amylopectin.

It is believed that the polysaccharides that are responsible for the effect are substantially linear polyglucosides containing 20 to 80 glucose units and particularly those containing 30 to 55 glucose units. The particular importance of these polyglucosides in, for example, the debranched amylopectin was shown by fractionation of the debranched amylopectin using standard gel column chromatography and measurement of the number of glucose units in the polyglucosides in particularly active fractions by the enzymic method described by Manners et al in Carbohydrate Research, 1971, 17, 109. Polysaccharide mixtures to have the effect to a useful extent should, it is believed, contain by weight, at least 2%, preferably at least 10%, of linear polyglucosides containing 30 to 55 glucose units.

The invention also provides a process in which aggregation of a protein in aqueous solution is induced by a dissolved polysaccharide mixture containing by weight, at least 2%, of linear polyglucosides containing 30 to 55 glucose units.

Suitable polysaccharide mixtures can be obtained as explained by treating amylopectin or a low-DE maltodextrin with an alpha-1,6-glucosidase. Comparable mixtures can at least in principle be made by fractionation of hydrolysates either of starch or of starch fractions or by synthesis.

Although polyglucosides within only a narrow range of numbers of glucose units per molecule are believed to be responsible for the remarkable effects observed, it has also been noted that saccharide mixtures containing only a narrow range of polyglucosides tend to have low solubility in water. The presence of a wide range of polyglucosides improves the overall solubility. Since it is the polyglucosides in solution that affect the proteins, it is advantageous to have other polyglucosides present as well as the narrowly defined polyglucosides. Such mixtures of polyglucosides are obtained by debranching amylopectin or low-DE maltodextrins and by all conceivably commercially feasible methods of fractionating hydrolysates of starch or starch fractions or methods of synthesis.

The amount of polysaccharide mixture required depends on many factors including the type and amount of protein, the polysaccharide mixture used, the desired extent of the effect and the presence and amount of other ingredients, for instance, salts. Appropriate amounts can readily be determined by simple experiment.

Temperature is a significant factor in determining how much aggregation occurs. One major result of the invention is to enable increased aggregation to occur at surprisingly low temperatures. In most cases temperatures higher than ambient, 17°C, are still required. The appropriate minimum temperature can readily be determined by simple experiment. Of course, heat is known to cause proteins to aggregate, and hence to precipitate or to flocculate but by use of the invention surprisingly low temperatures can be used. As far as proteins like casein are concerned the presence of the polysaccharide mixture makes the proteins precipitate on heating. The aggregation of casein is normally insufficient to cause precipitation even on boiling in aqueous solution. Suitable temperatures for casein in a process according to the invention are as low as 50°C.

The process of the invention is of particular significance in food manufacture where the acceptability of the polysaccharides is important. However, its usefulness is not limited to this area. Examples of use of the invention include the flocculation of materials, for instance in effluents, using protein and the saccharide mixtures; affecting the stability of nonfat dispersions; and the preparation of dairy products such as quark and yoghurt.

Among foodstuffs whose properties can be affected by use of the process are, in general, aqueous fat emulsions containing protein and containing or capable of containing a dispersed gas phase. The invention is particularly applicable to such systems. Whipped cream and ice cream are examples of such aqueous fat emulsions containing a dispersed gas phase. It is known that the quality of the final product, emulsions containing the dispersed gas phase, can be affected in a number of ways. For instance, stabilizers can be added to hinder coalescence of fat and, in ice cream, growth of ice crystals. Long chain polysaccharides are examples of such stabilizers. Emulsifiers also can be added. It was thought that these helped simply by aiding the emulsification of the fat in the aqueous phase. We now believe that for at least some emulsifiers their most important effect is to promote clumping of the fat droplets, which clumping leads to coalescence of the fat when or after the emulsion is whipped. Although stabilizers can be present to prevent undue coalescence of fat, a certain measure of such coalescence is recognised to be necessary for good product-characteristics.

It has been found that use of the present invention produces surprisingly powerful effects on the stability of such aqueous fat emulsions containing protein and a dispersed gas phase, especially when the gas phase has been incorporated after heat treatment, such as pasteurisation, of the protein-containing emulsion. The protein, such as casein, can be caused to aggregate and then to precipitate. The aggregated or precipitated casein destabilises the fat droplets by causing them to clump and finally to coalesce. This strongly affects the stability of the system, particularly when a gas is introduced. The amount of the polysaccharide mixture used according to the invention will depend on many factors, as mentioned above. In an aqueous fat emulsion it will in particular depend on the stability characteristics required. For instance, in ice cream there is an increase in the stability of the dispersed gas phase as small amounts of the polysaccharide mixture are added due to increased destabilization of the fat but as more of the polysaccharide mixture is added and increased fat destabilization occurs the stability of the product decreases.

1,6-glucosidases and their action on starch, starch fractions and other polysaccharides are described in a number of publications, for instance, U.S. Pat. Nos. 3,532,602, 3,535,123, 3,556,942 and 3,790,446, British Pat. Nos. 1,313,422, 1,268,443 and 1,313,421 and German Offenlegungsschrift 1,916,726. Suitable 1,6-glucosidases, particularly when freed from excessive amounts of other saccharidases, for use in preparing the polysaccharides used in the present invention can be isolated from many sources including plants and in particular the following micro-organisms (publications giving method of isolation) *Aerobacter aerogenes* U-58, ATCC 9621 and ATCC 15050 (U.S. Pat. No. 3,654,088), Cytophaga NCIB 9497 (British Pat. No. 1,048,887 and U.S. Pat. No. 3,790,446) and *Pseudomonas amyloderamosa* ATCC 21262, *Escherichia intermedia* ATCC 21073, *Streptomyces diastatochromogenes* IFO 3337, *Actinomyces globisporus* IFO 12208, *Nocardia asteroides* IFO 3384, *Micromonospora melanospora* IFO 12515 and *Thermonospora viridis* IFO 12207 (British Pat. No. 1,313,422).

A preferred source of alpha-1,6-glucosidase is Cytophaga NCIB 9497. This is a species of the genus Cytophaga and has been deposited by Glaxo Ltd in the National Collection of Industrial Bacteria, Aberdeen, Scotland under the number 9497. It is described in British Pat. No. 1,048,887 and U.S. Pat. No. 3,330,738 and its production of an alpha-1,6-glucosidase is described in U.S. Pat. No. 3,790,446. An advantage if the use of Cytophaga NCIB 9497 to produce the alpha-1,6-glucosidase is that it is produced substantially free of other enzymes that act on amylopectin or amylopectin fragments. Thus amylopectin and low-DE maltodextrins can be debranched with negligible further breakdown or concomitant breakdown of any amylose or amylose fractions present. (It should for clarity's sake be noted that the debranched amylopectin used in the process according to the invention can and almost always will have been prepared from amylopectin that contains some amylose. The amylose will merely act as diluent. To get as high a yield as possible of polyglucoside containing 20 to 80 glucose units the amount of amylose should be as low as possible. Waxy maize starch, since it contains a high proportion of amylopectin, is a preferred starting material. With low-DE maltodextrins similarly the amylose and amylose fractions present will act merely as diluent. Low-DE maltodextrins are believed to be prepared by liquefaction of a starch containing a high proportion of amylopectin and subsequent hydrolysis using amylase to the desired DE value. But whatever the method of preparation may be, low-DE maltodextrins are well-known products sold as such by many companies.)

A further advantage for the use of Cytophaga NCIB 9497 is that it can be used to produce the required saccharide mixtures directly without isolation of the alpha-1,6-glucosidase. This can be achieved by culturing the Cytophaga NCIB 9497 using amylopectin or a low-DE maltodextrin as primary or even sole saccharide energy source.

Alpha-1,6-glucosidases will differ in their specificity. For example pullulanase can remove maltosyl stubs (short side-chains) from degraded amylopectin; the alpha-1,6-glucosidase produced by Cytophaga NCIB 9497 cannot. As long as the enzyme or enzyme system has alpha-1,6-glucosidase activity, ie debranches amylopectin or low-DE maltodextrin and has no other hydrolytic effect on amylopectin or low-DE maltodextrin or the products it can be used. Differences in specificity can lead to slight differences in end products. For instance from low-DE maltodextrins some polyglucosides with stubs of maltosyl units could be expected after debranching with alpha-1,6-glucosidase from Cytophaga NCIB 9497. Presence of small amounts of such materials does not significantly affect the usefulness of the products.

The invention will now be illustrated further by the following examples.

EXAMPLE 1

Preparation of debranched maltodextrin 50g of 12-DE maltodextrin were dissolved in 1 liter of acetate buffer, pH 5.5 (100 mM sodium acetate adjusted to pH 5.5 with 50mM acetic acid). Crude 1,6-glucosidase extracted from Cytophaga NCIB 9497 was added to give an enzyme: substrate ratio of 1:50. The mixture was incubated at 37°C for 24 hours, until debranching was complete, and the product freeze-dried.

Incorporation of debranched maltodextrin into ice cream

Debranched 12-DE maltodextrin was added to ice cream at a level of 0.5%, as a partial replacement for sucrose. The ice cream mix was pasteurised at 70°C for 20 minutes, and processed through the freezer in the normal manner.

The typical ice cream formulation used was:

| | |
|---|---|
| Water | 63.56% |
| Milk solids | 9.48% |
| Palm oil | 9.45% |
| Sucrose | 14.38% |
| Locust bean gum | 0.18% |
| 42 DE corn syrup | 1.92% |
| Emulsifier | 0.50% |
| Flavour/colour | 0.03% |
| Debranched maltodextrin | 0.50% |

Results on standard tests for shape retention and meltdown were:

| Ice Cream | Shape Retention* | Meltdown* |
|---|---|---|
| The typical ice cream | 53% | 10mls/hour |
| The typical ice cream containing debranched maltodextrin | 70% | 0.5mls/hour |

*Tested as disclosed in Netherlands 7317072

EXAMPLES 2 and 3

Preparation of debranched amylopectin 5g amylopectin were dissolved in 1 liter of acetate buffer pH 5.5 by heating to 90°C for 10 minutes. The solution was cooled, and enzyme added as described for debranched maltodextrin to give enzyme:substrate of 1:50. Debranching was allowed to occur at 37°C for 24 hours. The product was freeze dried.

Incorporation of debranched maltodextrin (Example 2) and incorporation of debranched amylopectin (Example 3) into single cream Debranched 12-DE maltodextrin prepared as described in Example 1 was added to single dairy cream (18% fat) as the freeze dried solid, at level of 0.2%. Debranched amylopectin prepared as described above was added at 0.05%. The cream was pasteurised at 60°C for 10 minutes, cooled to 5°C, and whipped at 5°C in a Kenwood mixer.

Results

| | |
|---|---|
| Control | 200% overrun was obtained after 30 minutes whipping time. |
| Cream + debranched maltodextrin (Example 2) | 200% overrun obtained after 5 minutes whipping time. |
| and cream + debranched amylopectin (Example 3) | 200% overrun obtained after 5 minutes whipping time. |

With the control sample, prolonged whipping caused a decrease in the overrun, while in both Examples the products were stable.

EXAMPLE 4

Results similar to those given in Example 3 are obtained if debranched amylopectin is used prepared as described below rather than as described in Examples 2 and 3.

A culture medium, for composition see below, was inoculated with Cytophaga NCIB 9497 and incubated at 30°C for 4 days. A high yield of debranched amylopectin was obtained by spinning off the cells of Cytophaga and freeze-drying the supernatant.

| Culture medium was (% by weight): | |
|---|---|
| Amylopectin* | 1 |
| $NH_4NO_3$ | 0.5 |
| $K_2HPO_4$ | 0.1 |
| $MgSO_4 \cdot 7H_2O$ | 0.02 |
| NaCl | 0.01 |
| $CaCl_2 \cdot 6H_2O$ | 0.01 |
| $MnSO_4 \cdot 7H_2O$ | 0.00225 |
| $(NH_4)_6Mo_7O_{24} \cdot 4H_2O$ | 0.00036 |
| Zn acetate $\cdot 2H_2O$ | 0.00020 |
| $CuSO_4 \cdot 5H_2O$ | 0.00012 |
| $FeCl_3 \cdot 6H_2O$ | 0.002 |
| High purity water (containing NaOH to bring overall pH to 7.4) | to 100 |

*Snowflake Speciality Starch 30200 (B9101) Corn Products Corp.

EXAMPLES 5 and 6

Table 1 shows the aggregation of casein and soya protein, measured by light-scattering, induced by debranched low-DE maltodextrin and debranched amylopectin.

Example 5 was 1% casein plus 0.5% debranched amylopectin. Example 6 was 1% casein plus 0.5% debranched low-DE maltodextrin. Control A was 1% casein.

Example 7 was 1% soya protein plus 0.5% debranched 12-DE maltodextrin.

Control B was 1% soya protein.

TABLE 1

| Temperature °C | % Light-Scattered | | | | |
|---|---|---|---|---|---|
| | Example 5 | Example 6 | Control A | Example 7 | Control B |
| 25 | 42 | 42 | 42 | 47 | 38 |
| 35 | 45 | 48 | 41 | 50 | 38 |
| 40 | 52 | 85 | 40 | 53 | 39 |
| 60 | 75 | 80 | 38 | 68 | 40 |
| 80 | 68* | 78* | 37 | 81 | 42 |

*Reduced light-scattering with increased temperature probably because larger aggregates are formed.

EXAMPLE 8

Table 2 shows the effect debranched low-DE maltodextrin has on whey protein.

TABLE 2

| Heating time (minutes) at 75°C | % Light-Scattered | |
|---|---|---|
| | Example 8 | Control |
| 0 | 44 | 44 |
| 5 | 75 | 43 |
| 10 | 79 | 45 |
| 20 | 85 | 50 |

Example 8 was 0.5% whey protein plus 0.5% debranched 12-DE maltodextrin.

Control was 0.5% whey protein.

We claim:

1. A process for aggregating protein which comprises preparing an aqueous solution of a protein, adding thereto a polysaccharide aggregating agent selected from the group consisting of debranched amylopectin and debranched low D.E. maltodextrin, and allowing the protein to aggregate.

2. The process according to claim 1 wherein an aqueous solution of approximately 0.5 to 1% protein is prepared.

3. The process according to claim 1 wherein the aggregating agent is added to the protein solution in the form of an aqueous solution in the range 0.05 to 1% aggregating agent.

4. The process according to claim 1 wherein the aggregating agent is debranched by preparing an aqueous solution of the agent and adding thereto an α-1,6-glucosidase in a system free of enzymes having hydrolytic activity.

5. The process according to claim 4 wherein the α-1,6-glucosidase is produced by culturing the microorganism Cytophaga NCIB 9497.

6. The process according to claim 1 wherein the polysaccharide aggregating agent contains by weight at least 2% linear polyglucosides containing 30–55 glucose units.

7. The process according to claim 1 wherein the aggregating agent contains by weight at least 10% linear polyglucosides containing 30–55 glucose units.

8. A process for preparing a stable aqueous fat emulsion which comprises (a) preparing an emulsion comprising a fat and an aqueous phase containing protein and an aggregating agent selected from the group consisting of debranched amylopectin and debranched low D.E. maltodextrin, and (b) dispersing a non-reactive gas throughout the emulsion.

9. A process according to claim 8 wherein, after the gas is dispersed throughout the aqueous fat emulsion, the emulsion is cooled to form an ice confection.

* * * * *

UNITED STATES PATENT AND TRADEMARK OFFICE
CERTIFICATE OF CORRECTION

PATENT NO. : 3,956,519
DATED : May 11, 1976
INVENTOR(S) : Mervyn Thomas Arthur Evans et al.

It is certified that error appears in the above–identified patent and that said Letters Patent are hereby corrected as shown below:

Column 6, line 60, before "enzymes" insert --other--;
Column 6, line 61, after "activity" insert --on the agent--.

Signed and Sealed this

First Day of February 1977

[SEAL]

Attest:

RUTH C. MASON
Attesting Officer

C. MARSHALL DANN
Commissioner of Patents and Trademarks